(No Model.)
W. F. C. MORSELL.
POLARISCOPE.
No. 535,218. Patented Mar. 5, 1895.
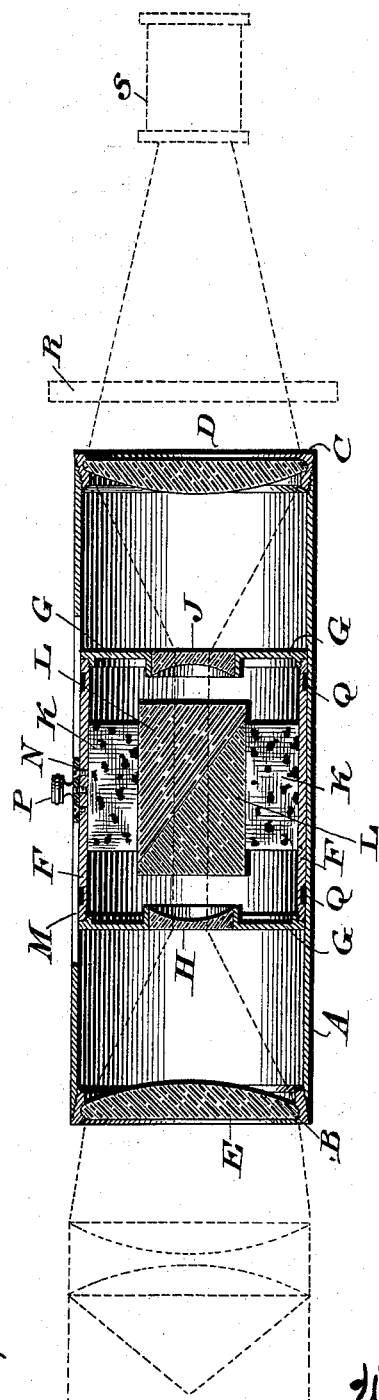

UNITED STATES PATENT OFFICE.

WILLIAM F. C. MORSELL, OF PHILADELPHIA, PENNSYLVANIA.

POLARISCOPE.

SPECIFICATION forming part of Letters Patent No. 535,218, dated March 5, 1895.

Application filed June 22, 1894. Serial No. 515,352. (No model.)

*To all whom it may concern:*

Be it known that I, WILLIAM F. C. MORSELL, a citizen of the United States, residing in the city and county of Philadelphia, State of Pennsylvania, have invented a new and useful Improvement in Polariscopes, which improvement is fully set forth in the following specification and accompanying drawing.

My invention relates to an improvement in polariscopes and consists of a polarizer in which a system of reciprocal lenses, and a single small Nicol prism perform the function heretofore attained by the use of two larger expensive Nicol prisms, one being employed as a polarizer and the other as an analyzer, whereby a very inexpensive and efficient apparatus is produced, all as will be hereinafter set forth.

The figure represents a longitudinal vertical section of a polariscope embodying my invention.

Referring to the drawing: A designates an inclosing cylinder, within the ends of which are inserted the bushings B and C, which serve as supports or holders for the plano convex lenses D and E, the plane side of each of said lenses being on the outside as shown.

F designates an inner cylinder of less length than the outer cylinder, the outer diameter of said cylinder F being substantially the same as the inner diameter of the cylinder A, the packing rings Q serving to make a tight joint between the two cylinders, and to hold the inner cylinder in any desired position relative to the lenses E and D. The ends G of said cylinder F have central apertures in which are supported the plano-concave lenses H and J, the concavo portions of said lenses facing each other, and it will be noticed that both pairs of lenses E, H, and J, D, are alike in all respects.

K, K, designate pieces of cork within the inner cylinder, which support a Nicol prism L, made by cementing two portions of Iceland spar together in the usual manner. The cylinder A has a longitudinal slot M, which serves as a guide for the block N, which is suitably secured to the inner cylinder F.

P designates a screw or pin, by means of which the inner cylinder F and its adjuncts are moved.

R designates the object which is to be viewed, and S designates the analyzer.

The operation is as follows: By the aid of the plano-convex lens E, the rays of light are condensed, as shown by the dotted lines, and are then rendered parallel by the plano concave lens H, and the parallel beam then proceeds through the Nicol prism L, and after passing through the latter it is again expanded by the plano concave lens J, so as to fill the field of the plano concave lens D, which is to be of such a focus as to receive and condense the beam of light for projection or for direct presentation to the eye. Since the polarizer is to be rotated, and as the various kinds of light for projection, viz: oil, oxyhydrogen, electric, sunlight, &c., require varying foci, the device carrying the plano concave lenses and the Nicol prism, is made readily adjustable, in such a manner as not to interfere with the rotation of the polarizer, the inner cylinner F being movable longitudinally by means of the pin P, the above polarizer being readily applicable to projecting and table polariscopes.

By the use of a single small Nicol prism, and the system of reciprocal lenses, the necessity for the employment of large expensive Nicol prisms, to give a perfectly black field of the requisite dimensions to cover the standard size of objects which the most effective polariscope must have, is entirely obviated, and a very inexpensive and efficient apparatus is provided, as is evident, and it is also obvious that any other element possessing properties similar to a Nicol prism may be employed in the place thereof, and I do not desire to be limited to the exact constructions I have shown and described.

Having thus described my invention, what I claim as new, and desire to secure by Letters Patent, is—

1. In a polariscope, a polarizer comprising a system of reciprocal lenses, and a Nicol prism, or its equivalent, said parts being combined substantially as described.

2. A polarizer comprising two pairs of similar lenses E, H, and J, D, and a Nicol prism, substantially as described.

3. In a polariscope, a polarizer comprising the two pairs of plano convex and plano concave lenses E, H, and J, D, and a Nicol prism, and means for adjusting the prism and the plano-concave lenses relatively to the plano convex lenses, said parts being combined substantially as described.

4. The cylinder A, having the plano convex lenses D and E suitably supported in its ends, and the inner cylinder F whose ends support the plano concave lenses H and J, and a Nicol prism, said cylinder F being capable of longitudinal adjustment, said parts being combined substantially as described.

WILLIAM F. C. MORSELL.

Witnesses:
JOHN A. WIEDERSHEIM,
A. P. JENNINGS.